(12) United States Patent
Yamakado et al.

(10) Patent No.: US 7,006,884 B2
(45) Date of Patent: Feb. 28, 2006

(54) RECYCLING ANALYZING SYSTEM, RECYCLING ANALYZING PROGRAM, AND RECYCLING ANALYZING METHOD

(75) Inventors: Hitoshi Yamakado, Hino (JP); Gu Yu, Hino (JP); Toru Miyamoto, Hino (JP)

(73) Assignee: Seiko Epson Corporation, Tokyo (JP)

( * ) Notice: Subject to any disclaimer, the term of this patent is extended or adjusted under 35 U.S.C. 154(b) by 37 days.

(21) Appl. No.: 10/754,551

(22) Filed: Jan. 12, 2004

(65) Prior Publication Data

US 2004/0215360 A1 Oct. 28, 2004

(30) Foreign Application Priority Data

Jan. 30, 2003 (JP) .............................. 2003-022018

(51) Int. Cl.
*G06F 19/00* (2006.01)

(52) U.S. Cl. .............................. 700/97; 700/95; 700/111

(58) Field of Classification Search ................. 700/95, 700/97, 112, 105, 108, 111, 116; 703/7, 703/1; 29/403.3, 407.1; 705/29; 209/3.3; 235/375

See application file for complete search history.

(56) References Cited

U.S. PATENT DOCUMENTS

| 5,586,022 A | * | 12/1996 | Arimoto et al. | ............... 700/97 |
| 5,965,858 A | * | 10/1999 | Suzuki et al. | ............... 235/375 |
| 6,305,548 B1 | * | 10/2001 | Sato et al. | .................... 209/3.3 |
| 2004/0143355 A1 | * | 7/2004 | Uetake et al. | ............... 700/116 |

FOREIGN PATENT DOCUMENTS

JP    A 2002-197147    7/2002

* cited by examiner

*Primary Examiner*—Leo Picard
*Assistant Examiner*—Steven R. Garland
(74) *Attorney, Agent, or Firm*—Oliff & Berridge, PLC

(57) ABSTRACT

A recycling analyzing system comprising: a standard operation time memory which stores standard time for disassembling operation of each component beforehand; an operation time memory which stores time for disassembling operation of each component to be disassembled; an operation time counting unit which counts the time for disassembling operation time of each component constituting the item to be recycled, and stores them in the operation time memory; and a difficult operation extracting unit which refers to the standard time stored in the standard operation time memory, and the time for disassembling operation of each component stored in the operation time memory, and extracts disassembling operations which is difficult.

4 Claims, 13 Drawing Sheets

| DISASSEMBLY ACTUAL COMPONENT ID | ACTUAL OPERATION TIME |
|---|---|
| 0001 | 5 |
| 0001 | 6 |
| 0002 | 40 |
| 0003 | 35 |
| ⋮ | ⋮ |

FIG. 18

| COMPONENT ID | NECESSARY OPERATION |
|---|---|
| 0001 | 1 |
| 0002 | 10, 11 |
| 0003 | 21, 22 |
| ⋮ | ⋮ |

FIG. 19

| OPERATION ID | STANDARD OPERATION TIME (SEC) |
|---|---|
| 1 | 5 |
| 2 | 10 |
| ⋮ | ⋮ |
| 10 | 15 |
| 11 | 20 |
| ⋮ | ⋮ |
| 21 | 10 |
| 22 | 30 |
| ⋮ | ⋮ |

RECYCLING ANALYZING SYSTEM, RECYCLING ANALYZING PROGRAM, AND RECYCLING ANALYZING METHOD

Priority is claimed on Japanese Patent Application No. 2003-022018, filed Jan. 30, 2003, the content of which is incorporated herein by reference.

BACKGROUND OF THE INVENTION

1. Field of the Invention

This invention relates to a system for facilitating disassembling operation of items to be recycled, such as OA products or electrical household appliances, and in particular relates to a recycling analyzing system, a recycling analyzing program, and a recycling analyzing method, which can extract disassembling operation which is difficult, to perform the disassembling operation efficiently.

2. Description of Related Art

Conventionally, a recycling method such as disclosed in Japanese Patent Application No. 2002-197147 is used in facilitating an operation of disassembling items to be recycled, such as OA products or electrical household appliances.

This is a method for recycling components and materials of the items to be recycled, and is performed by the following steps (a) to (g).

(a) Items to be recycled, arising in specified areas, are conveyed to a specified collection site and stored there.

(b) The specified collection site has an input section for reading first appliance data that is appended to the item to be recycled, and a memory for storing a disassembly database including data required to compare, disassemble, and classify, the item to be recycled. At the specified collection site, the first appliance data of the item to be recycled, obtained in the input section, is compared with a corresponding disassembly database.

(c) Based on the comparison between the first appliance data of the items to be recycled and the disassembly database, the items to be recycled are classified into a plurality of first categories, and classification data relating to the items to be recycled is stored in the disassembly database as the second appliance data.

(d) The specified collection site identifies disassembly processing outside member data and non-disassembly processing member data of the items to be recycled, which have been classified into the plurality of first categories, based on the first product data or the disassembly database. And the specified collection site has a display for displaying an identification results, and stores the disassembly processing outside member data and the non-disassembly processing member data in the disassembly database.

(e) Based on the result displayed in the display, the items to be recycled are disassembled into the disassemble-processing outside members and the non-disassemble-processing members, and the disassemble-processing outside members are classified into a plurality of second categories.

(f) Regarding to the non-disassembly processing members and the disassembly processing outside members, which have been classified into the plurality of second categories, the disassemble-processing outside members are conveyed to each material maker, and the non-disassembly processing members are conveyed to each product maker, and accumulated there.

(g) The accumulated disassembly processing outside members are processed into reproduction materials using a processing method, based on the disassembly database, and data relating to the reproduction materials is stored in the disassembly database.

Then, the disassembly database is made communal for the specified collection site, the material makers, and the product makers, via a network.

In the conventional recycling method described the above, based on the result displayed in the display, the items to be recycled are disassembled into non-disassembly processing members and disassembly processing outside members. More specifically, at first, the disassembly data is displayed in the display, and, based on the displayed disassembly data, the outside members and body section of the items to be recycled are disassembled. At this time, in the disassembly data includes disassembly data relating to the outside members and body sections of the items to be recycled, and recycle data and reuse data relating to the outside members and the body sections, which contain at least the type of material used in the outside members and the body sections, the name of the material maker of the outside members and the body sections, the name of the maker of the item to be recycled from the outside members and the body sections, the name of the outside members and the body sections, and the parts number of the outside members and the body sections.

OA products and the like have been designed and developed with consideration given mainly to their function, marketing price, and manufacturing cost, rather than to such matters as simplifying their disassembly and reducing their disposal cost.

Recently, attention is being given to the recycling of components used in these appliances, with the aim of simplifying the operations of disassembling and recycling the appliances.

However, unlike the manufacturing operation, the disassembling operation is not always done for the same appliances, and the number of items to be disassembled differs every day. For these reasons, it is difficult to determine whether the disassembling operation will be easy or not. Moreover, objective analyses may be required in order to disassemble the items efficiently.

SUMMARY OF THE INVENTION

Accordingly, the present invention was made in view of the unsolved difficulties of the conventional methods described the above, and the object thereof is to provide a recycling analyzing system, a recycling analyzing program, and a recycling analyzing method, which can extract difficult operations by carrying out analysis to enable efficient disassembly operation.

In order to achieve the above object, the present invention provides a recycling analyzing system analyzes disassembly of an item to be recycled, comprising: a standard operation time memory which stores standard time for disassembling operation of each component beforehand; an operation time memory which stores time for disassembling operation of each component to be disassembled; an operation time counting unit which counts the time for disassembling operation of each component which constitutes the item to be recycled, and stores the time for disassembling operation in the operation time memory; and a difficult operation extracting unit which refers to the standard time for disassembling operation stored in the standard operation time memory, and the time for disassembling operation of each component stored in the operation time memory, and extracts disassembling operation which is difficult.

According to this constitution, with regard to the disassembling operation of each component, the time taken from the start of the operation until its end is automatically counted and compared with the standard time, in order to extract disassembling operation which is difficult. Therefore, the difficulty of each disassembling operation can be evaluated objectively. Further, by notifying the evaluation results to a design section, the evaluation results can be reference data for redesigning products with greater consideration given to facilitating its disassembly.

The difficult operation extracting unit may extracts the disassembling operation of each component which is difficult, based on a comparison between the standard time for disassembling operation and the time for disassembling operation.

According to this constitution, the difficulty of each disassembling operation can be evaluated objectively. In particular, since the evaluation of difficulty is based on a comparison with standard time, the deviation from standard time for disassembling operation can be determined. In addition, the evaluation results can be used for redesigning of products with greater consideration given to facilitating its disassembly.

BRIEF DESCRIPTION OF THE DRAWINGS

FIG. 18 is a diagram showing the table constitution of an operation analysis database 72.

FIG. 19 is a diagram showing the table constitution of an operation analysis database 72.

DETAILED DESCRIPTION OF THE INVENTION

An embodiment of the present invention will be explained with reference to the drawings. FIGS. 1 to 19 show an embodiment a recycling analyzing system of the present invention.

Figure 1:
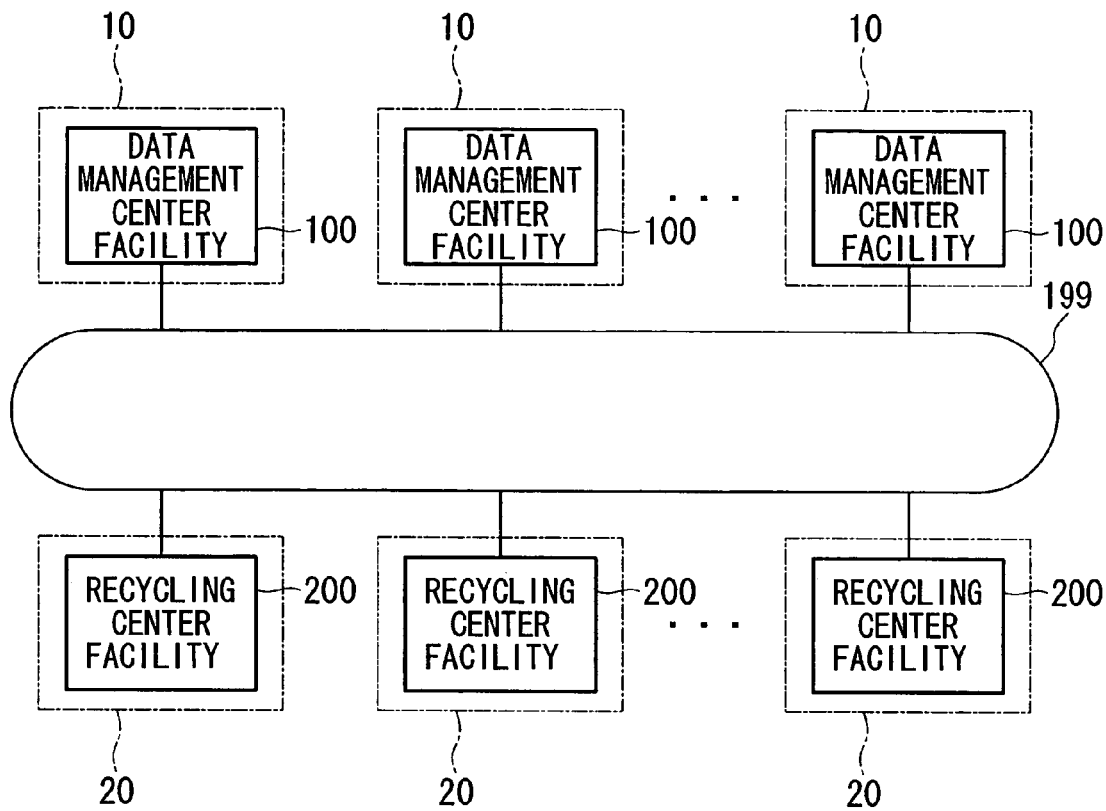
FIG. 1 is a block diagram showing the constitution of a network system implementing the present invention.

As shown in FIG. 1, the present embodiment is made by applying the recycling analyzing system of the present invention to disassembling and classification of the items to be recycled, such as OA products and electrical household appliances in a recycling center 20.

At first, the constitution of a network system of the present embodiment will be explained with reference to FIG. 1. FIG. 1 is a block diagram showing the constitution of the network system of the present embodiment.

As shown in FIG. 1, a plurality of data management centers 10 and a plurality of recycling centers 20 are provided in each region. Each data management center 10 has a data management center facility 100, each recycling center 20 has a recycling center facility 200, and the data management center facilities 100 and the recycling center facilities 200 are connected via an internet 199 so that they can transmit and receive communications between each other.

Subsequently, the constitution of the data management center facility 100 will be explained with reference to FIG. 2.

Figure 2:
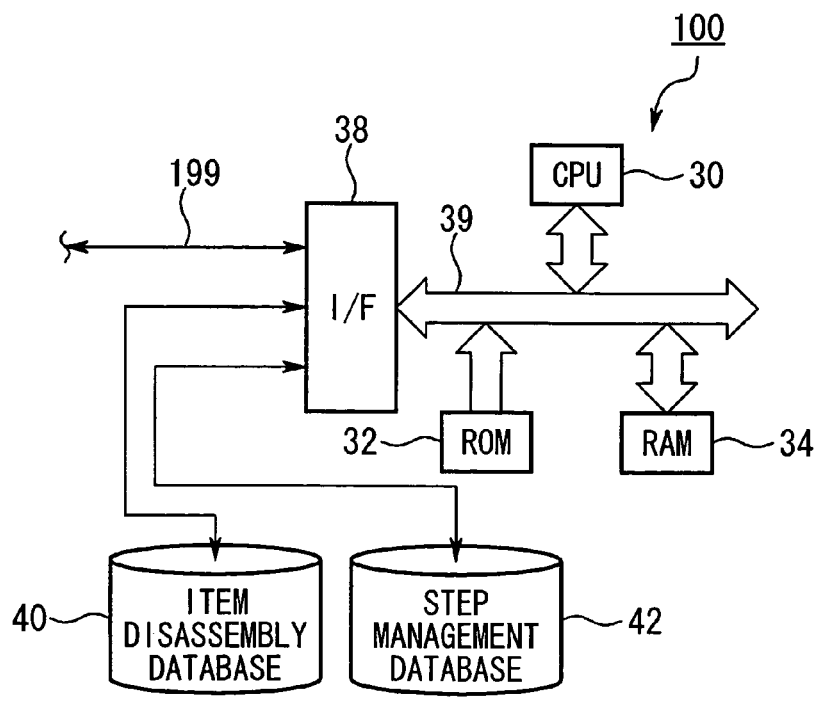
FIG. 2 is a block diagram showing the constitution of a data management center 100.

FIG. 2 is a block diagram showing the constitution of the data management center facility 100.

As shown in FIG. 2, the data management center facility 100 includes a CPU 30 that makes computations based on a control program and controls the entire system, a ROM 32 that stores a control program and the like for the CPU 30 beforehand in a predetermined region, a RAM 34 for storing data read from the ROM 32 and computation results, which are required in the computation processes of the CPU 30, and an I/F 38 that acts as a medium for inputting and outputting data to and from outside devices; these components are connected to each other so as to be able to receive data by a bus 39, which is a signal line for transferring the data.

An item disassembly database 40, which stores item disassembly data for constructing a plurality of different disassembly diagrams in the step of disassembling the items to be recycled, a step management database 42, which stores step management data including external images of the items to be recycled in correspondence with item disassembly data, and a signal line for connecting to the internet 199, are connected to the I/F 38 as outside devices.

Figure 3:
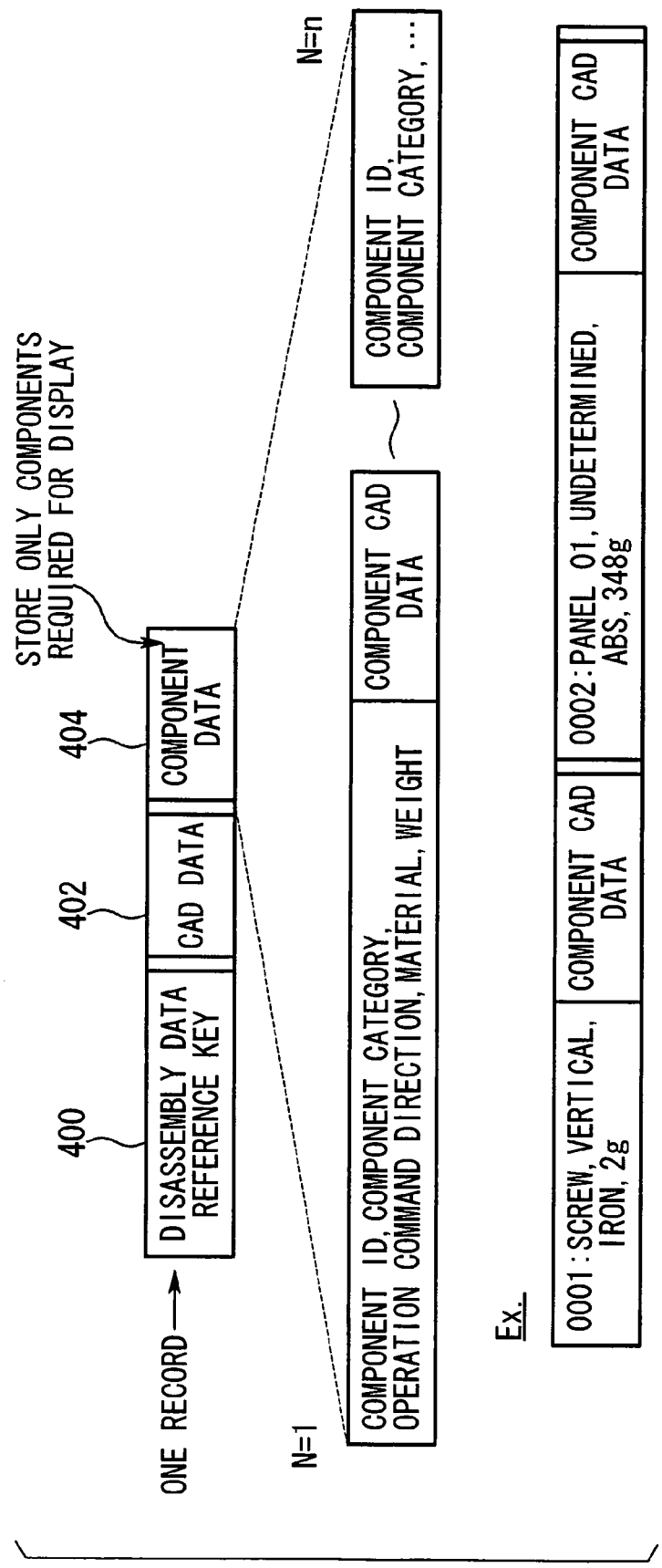
FIG. 3 is a diagram showing the data structure of an item disassembly database 40.

FIG. 3 shows the data structure of the item disassembly database 40.

The item disassembly database 40 stores item disassembly data in correspondence with item ID data (e.g. product number and name of machine type) for identifying the item to be recycled. As shown in FIG. 3, the item disassembly database 40 stores one or a plurality of records for each item to be recycled. Each record corresponds to one segment when the disassembly process is segmented, and stores data for constructing a disassembly diagram, which illustrates the operating sequences for shifting to the next segment of the step; more specifically, one record includes a field 400 that stores a disassembly data reference key, a field 402 that stores CAD data for constructing the disassembly diagram, and a field 404 that stores component data, which relates to components including the item to be recycled.

The component data relates to components which constitutes the items to be recycled, which are necessary for displaying the disassembly diagram, and contains a component ID, a component category, an operation command direction, material, weight, and component CAD data, for each component. In the example shown in FIG. 3, a component number of "0001", a component category of "screw", an operation command direction of "vertical", and a material of "iron" are stored as component data for a screw, which is one of the components. The component CAD data includes three-dimensional coordinate data, and can be used to create a drawing showing the shape seen from a given direction by converting the coordinates.

Figure 4:
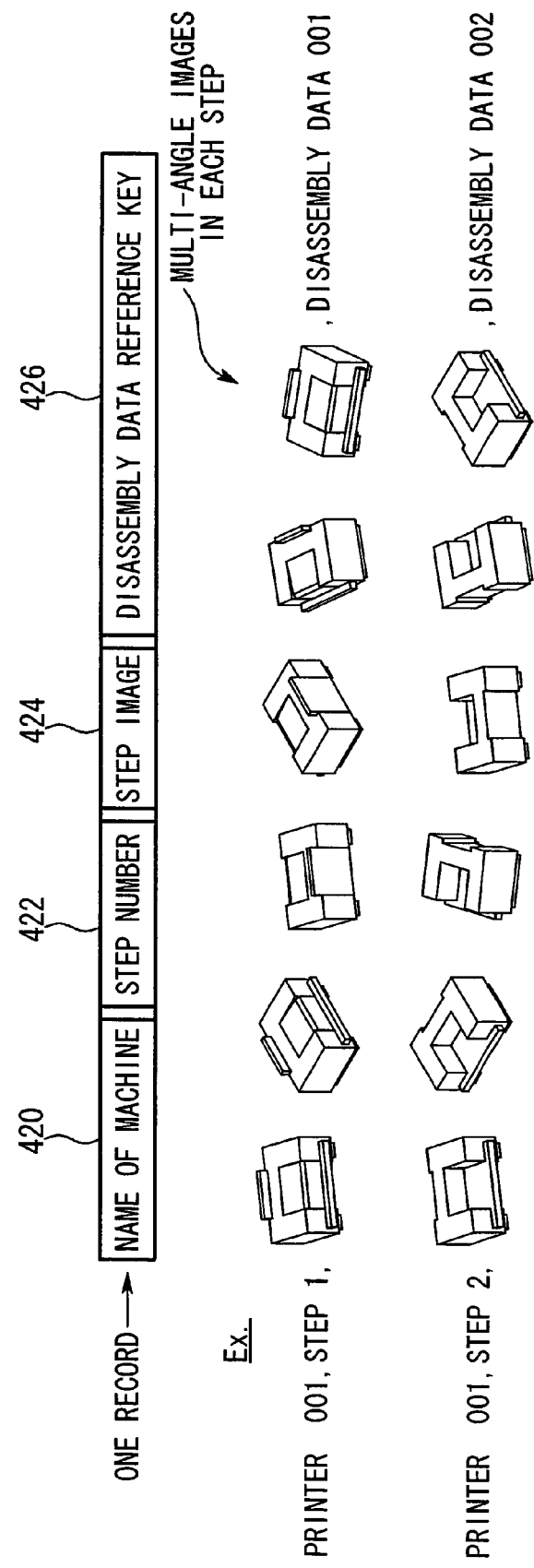
FIG. 4 is a diagram showing the data structure of a step management database 42.

FIG. 4 is a drawing showing the data structure of the step management database 42.

The step management database 42 stores the step management data in correspondence with the item ID data. As shown in FIG. 4, the step management database 42 stores one or a plurality of records for each item ID data. Each record corresponds to one segment when the disassembly process is segmented in the same manner as mentioned the above, and stores data for managing the step of that segment including a field 420 for storing the name of machine type, a field 422 for storing a step number of the step, and a field 424 for storing an external image (hereinafter simply "step image") of the item to be recycled, and a field 426 for storing a disassembly data reference key of the item disassembly data for constructing the disassembly diagram. In the example shown in FIG. 4, the first record stores "printer001" as the name of machine type, "step 1" as the step number, external images of the item to be recycled viewed from a plurality of angles as the step image, and "disassembly data 001" as the disassembly data reference key. This signifies that, when disassembling an item to be recycled having the machine name of "printer001", the actual external image is compared with the step images to determine whether the disassembling operation is the first step, and, when it has been determined that the disassembling operation is the first step, a disassembly diagram is constructed based on item disassembly data identified by a disassembly data reference key of "disassembly data 001".

Figure 5:
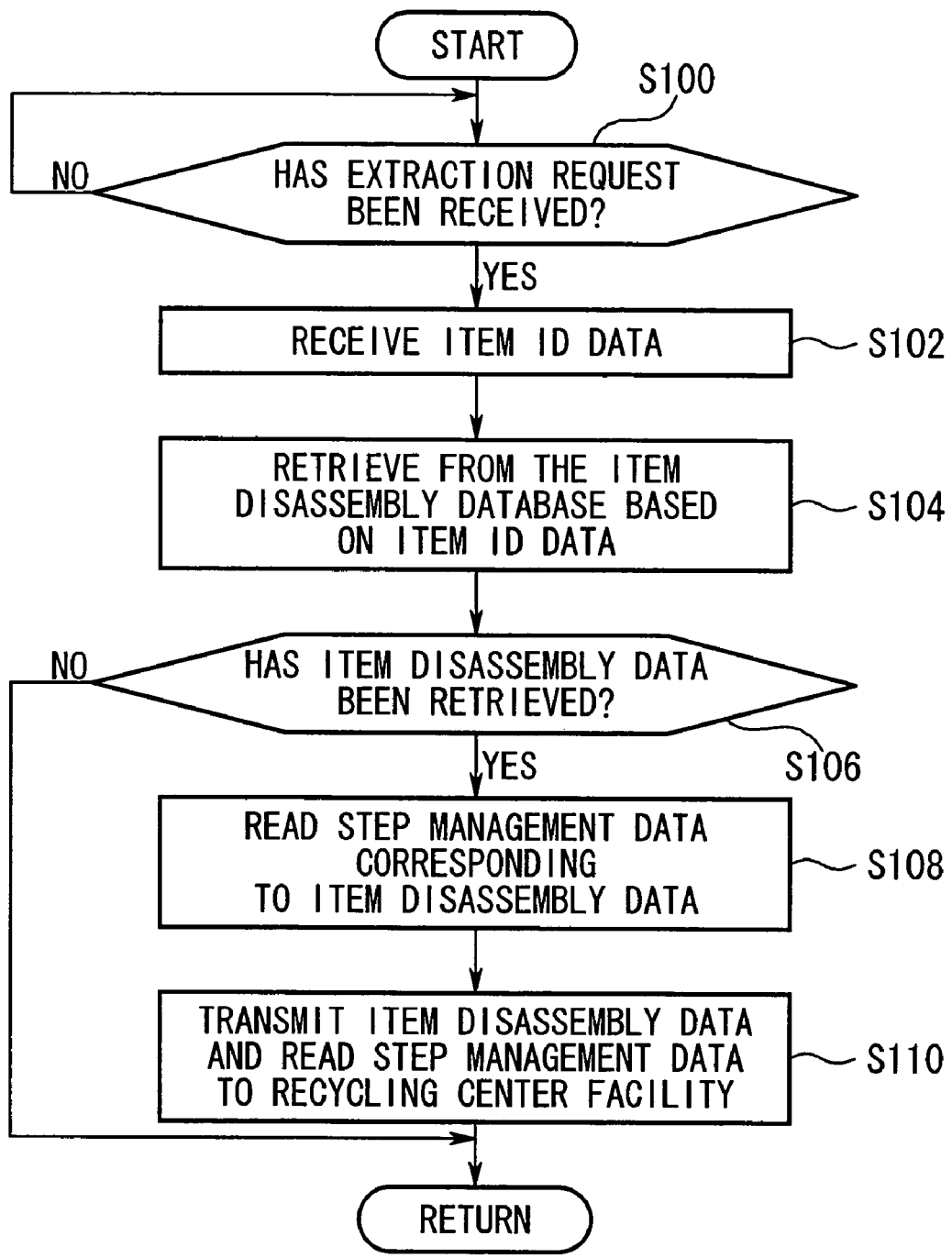
FIG. 5 is a flowchart showing item disassembly data supply process.

The CPU 30 includes a microprocessing unit MPU or the like, and activates a predetermined program stored in a predetermined region of the ROM 32; in compliance with this program, the CPU 30 executes an item disassembly data supply process shown in FIG. 5.

FIG. 5 is a flowchart showing the item disassembly data supply process.

The item disassembly data supply process is a process of supplying the item disassembly data and the step management data to the recycling center facility 200 in accordance with an extraction request therefrom; when executed by the CPU 30, processing shifts to step S100 as shown in FIG. 5.

In step S100, the CPU 30 determines whether an extraction request for item disassembly data and step management data has been received; when it is determined that such an extraction request has been received (Yes), the process shifts to step S102, and when it is determined that such an extraction request has not been received (No), the CPU 30 stands by in step S100 until it is received.

The item ID data is received in step S102, and the CPU 30 proceeds to step S104 where, based on the received item ID data, all the item disassembly data corresponding to the item ID data are retrieved from the item disassembly database 40, before proceeding to step S106.

In step S106, the CPU 30 determines whether the item disassembly data has been retrieved; when it is determined that the item disassembly data has been retrieved (Yes), the process shifts to step S108, and reads all of the step management data corresponding to the retrieved item disassembly data from the step management database 42, and shifts to step S110.

In step S110, the retrieved item disassembly data and read step management data are transmitted to the recycling center facility 200, this series of processes ends and returns to the original processing.

On the other hand, when it is determined in step S106 no item disassembly data has been received (No), this processing series ends and the CPU 30 returns to the original processing.

Subsequently, the constitution of the recycling center facility 200 will be explained in detail with reference to FIG. 6.

Figure 6:
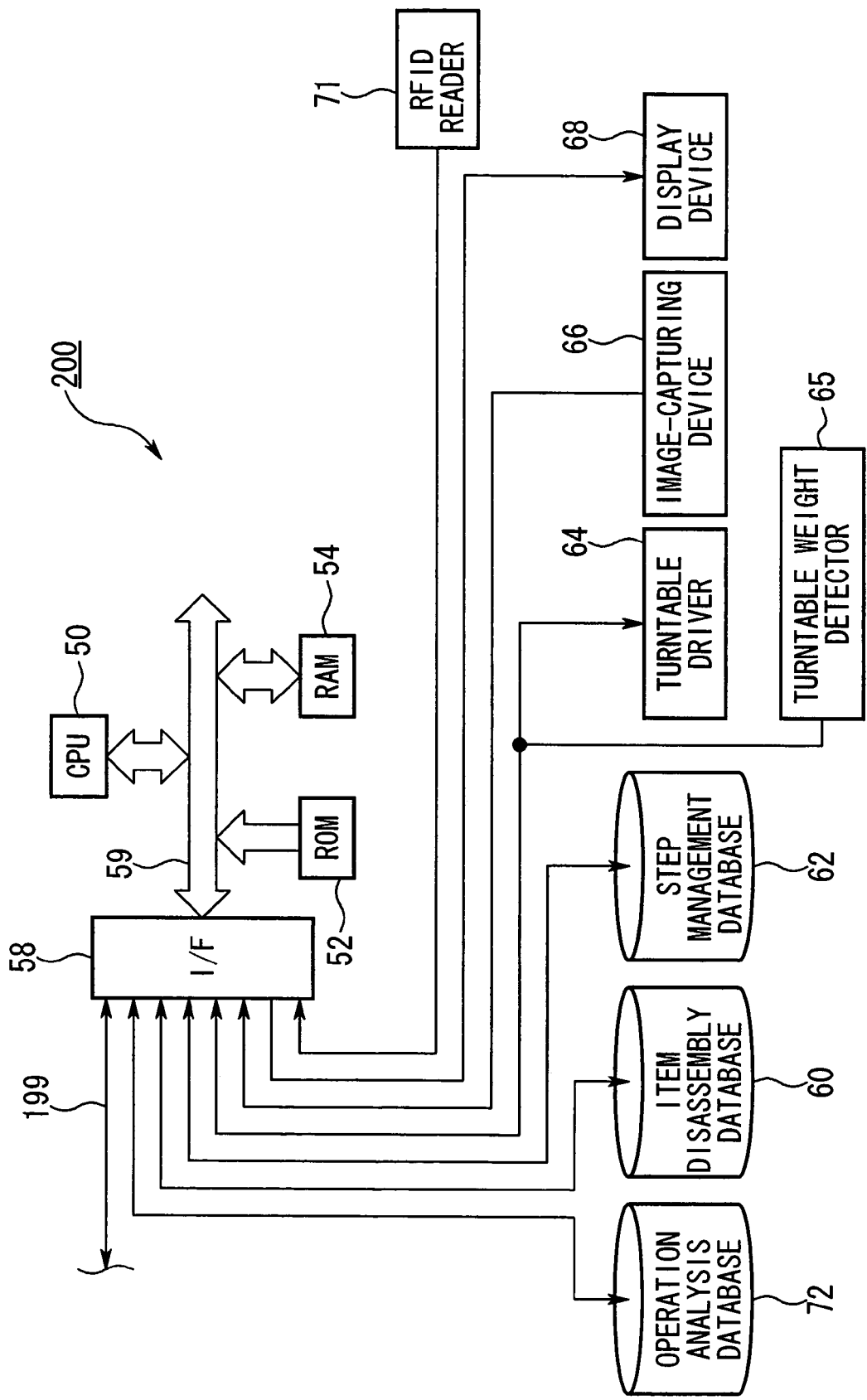
FIG. 6 is a block drawing showing the constitution of a recycling center facility 200.

FIG. 6 is a block diagram showing the constitution of the recycling center facility 200.

As shown in FIG. 6, the recycling center facility 200 includes a CPU 50, which controls the entire system and computations based on a control program, a ROM 52, which stores control programs and the like of the CPU 50 beforehand in a predetermined region, a RAM 54 for storing data read from the ROM 52 and computation results, which are required in the computation processes of the CPU 50, and an I/F 58 that acts as a medium for inputting and outputting data to and from outside devices; these are connected to each other so that they can receive data through a bus 59, which is a signal line for transferring the data.

An item disassembly database 60, which stores item disassembly data, a step management database 62, which stores step management data, a turntable driver 64, which drives an unillustrated turntable used as an operation table for mounting the item to be recycled, a turntable weight detector 65 for detecting the weight of the item mounted on the turntable, an image-capturing device 66 for capturing an external image of the item to be recycled that is mounted on the turntable, a display device 68 for displaying a screen based on an image signal, a radio frequency identification system (RFID) reader 71 for reading RFID tags, which are attached to each component including the item to be recycled, and a signal line for connecting to the internet 199, are connected to the I/F 58 as outside devices. The item disassembly database 60 has the same data structure as the item disassembly database 40, and the step management database 62 has the same data structure as the step management database 42.

Figure 7:
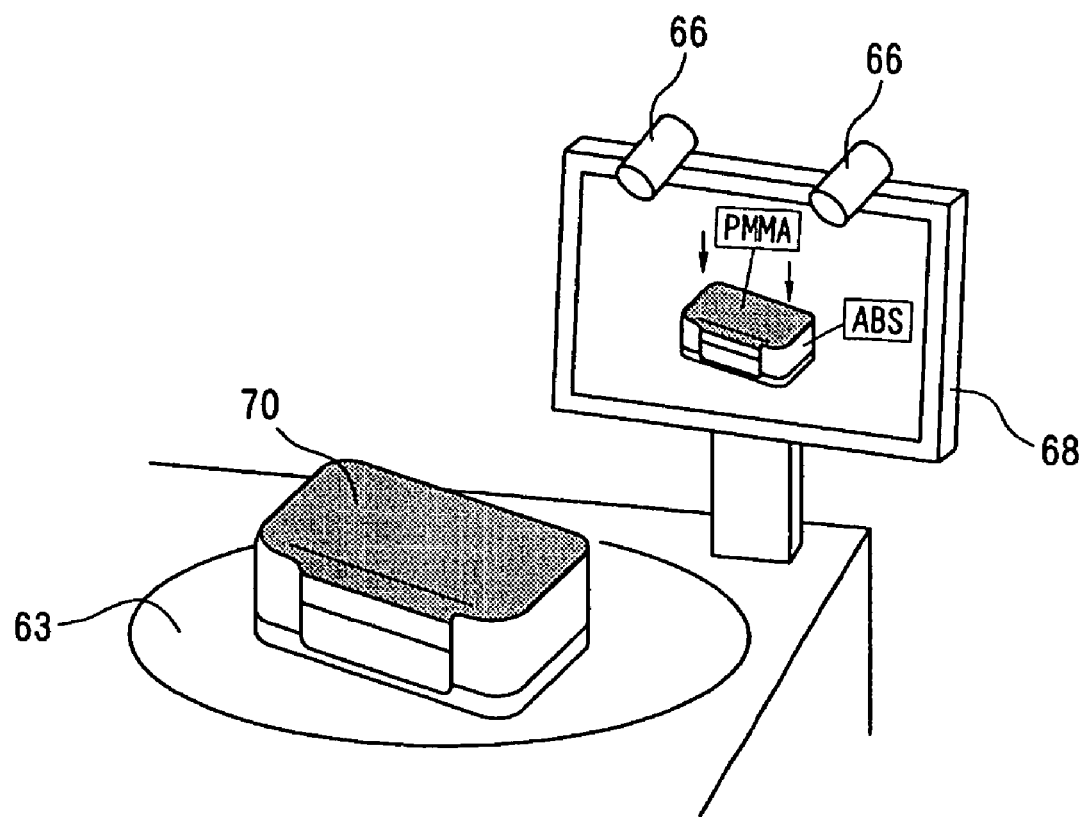
FIG. 7 is a diagram showing the arrangement constitution of an image-capturing device 66 and a display device 68.

FIG. 7 is a drawing showing the arrangement constitution of the image-capturing device 66 and the display device 68.

In FIG. 7, an item to be recycled 70 is mounted on a turntable 63. Beside the turntable 63 is provided the display device 68, which the disassembly operator views as he performs the disassembling operation. The image-capturing device 66 is attached above the display device 68, enabling it to capture an external image of the item to be recycled 70, mounted on the turntable 63.

Figure 8:
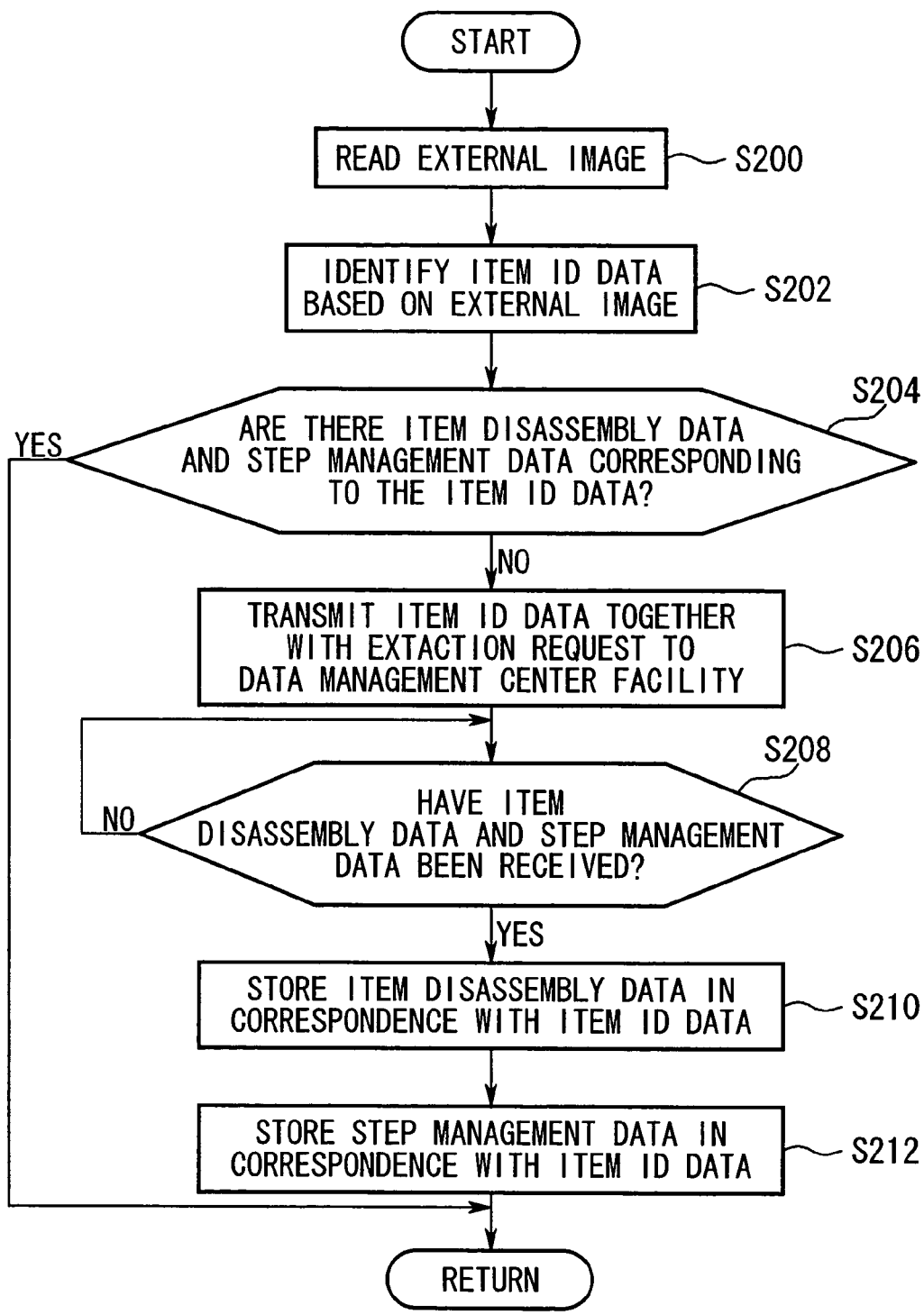
FIG. 8 is a flowchart showing an item disassembly data extraction process.
Figure 9:
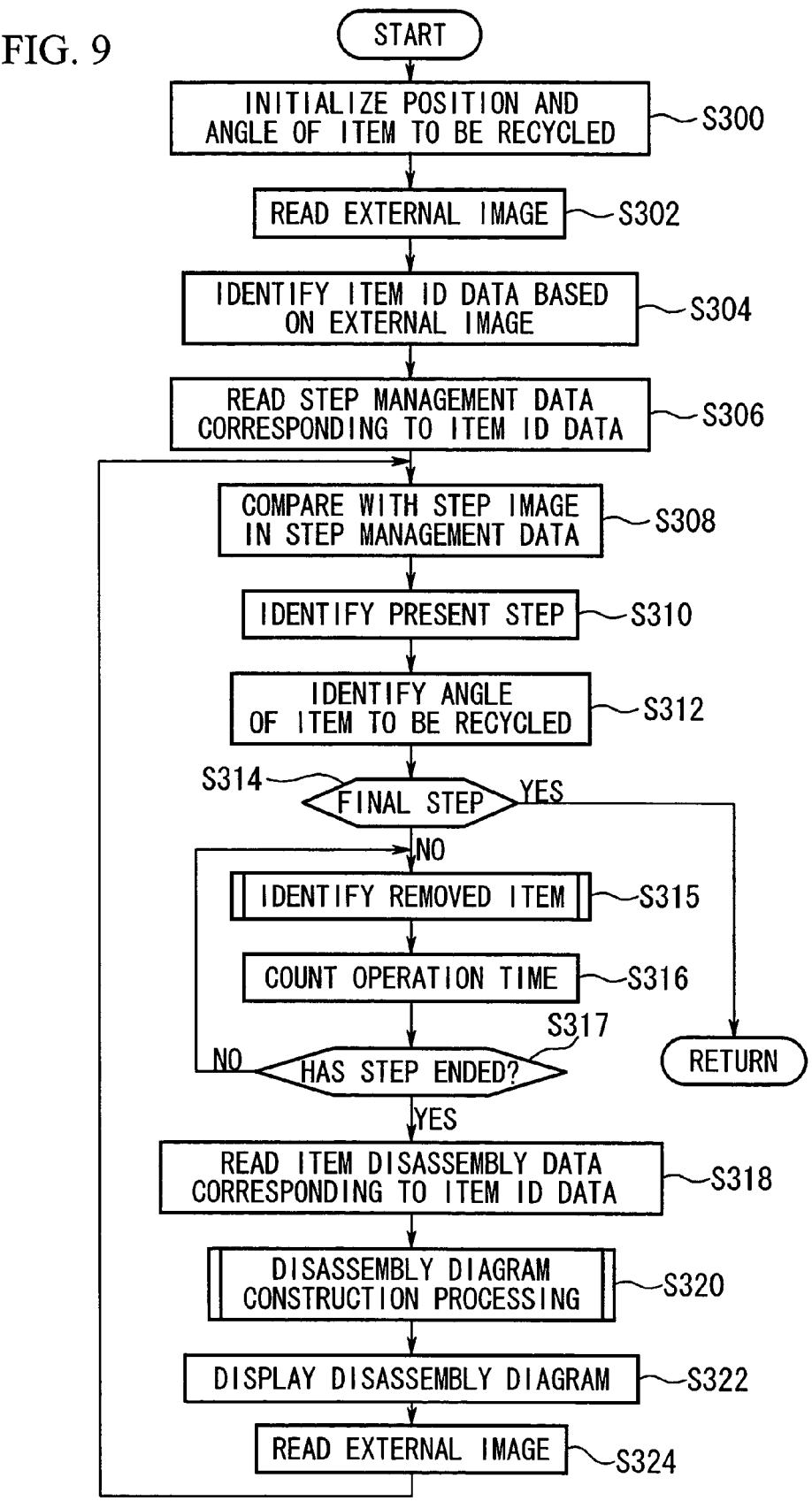
FIG. 9 is a flowchart showing a disassembly diagram displaying process.

The CPU 50 includes a microprocessing unit MPU or the like, and activates predetermined programs stored in predetermined regions of the ROM 52; in compliance with the programs, the CPU 50 executes an item disassembly data extraction process and a disassembly diagram display process, shown in the flowcharts of FIGS. 8 and 9, in a time-sharing manner.

At first, the item disassembly data extraction process will be explained with reference to FIG. 8.

FIG. 8 is a flowchart showing an item disassembly data extraction process.

The item disassembly data extraction process is a process for extracting item disassembly data and step management data from the data management center facility 100 in correspondence with the item disassembly data supply process shown in FIG. 5; when executed by the CPU 50, the process first shifts to step S200 as shown in FIG. 8.

In step S200, the image-capturing device 66 captures an external image of the item to be recycled 70, which is mounted on the turntable 63; then, proceeding to step S202, the item ID data of the item to be recycled 70 is identified based on the captured external image, and processing proceeds to step S204.

In step S204, the CPU 50 determines whether the item disassembly data and step management data corresponding to the item disassembly data, which was identified, are stored in the item disassembly database 60 and the step management database 62 or not; when it determines that the item disassembly data and step management data corresponding to the item disassembly data, which was identified, are not in the databases (No), the CPU 50 shifts to step S206, where it transmits the identified item disassembly data with an extraction request to the data management center facility 100, and then shifts to step S208.

In step S208, the CPU 50 determines whether the item disassembly data and the step management data have been received; when it determines that they have been received (Yes), it proceeds to step S210, otherwise (No), it stands by in step S208 until the item disassembly data and the step management data are received.

In step S210, the received item disassembly data is stored in the item disassembly database 60 in correspondence with the item ID data, and, shifting to step S212, the received step management data is stored in the step management database 62 in correspondence with the item disassembly data, whereby one series of processes ends and the CPU 50 returns to its original processing.

On the other hand, when it is determined in step S204 that the item disassembly data and step management data corresponding to the identified item disassembly data are already stored in the item disassembly database 60 and the step management database 62 (Yes), one series of processes ends and the CPU 50 returns to its original processing.

Subsequently, disassembly diagram display processing will be explained in detail with reference to FIG. 9.

FIG. 9 is a flowchart showing the disassembly diagram display process.

Disassembly diagram display processing is executed at the start of the disassembling operation, and involves displaying a disassembly diagram on the display device 68 in accordance with the progress of the disassembling operation of the item to be recycled 70; as shown in FIG. 9, when the CPU 50 executes the disassembly diagram display process, it shifts to step S300.

In step S300, the CPU 50 drives the turntable driver 64, initializes the position and angle of the item to be recycled 70 mounted on the turntable 63, then shifts to step S302, in which the image-capturing device 66 captures an external image of the item to be recycled 70 mounted on the turntable 63, and then, in step S304, the item disassembly data of the item to be recycled 70 is identified based on the captured external image, and the process proceeds to step S306.

In step S306, all the step management data corresponding to the identified item disassembly data is read out from the step management database 62, and, shifting to step S308, the captured external image is compared with the step images included in the step management data which was read; step images which are identical or similar to the captured external image are identified there, and the process shifts to step S310. Here, "step" denotes operations such as "remove control panel" and the like. In order to execute this step, a plurality of components must be removed by operations such as "remove four screws", "remove control panel protective member" and "remove control panel".

In step S310, the present step is identified from the identified step images, and, in step S312, the angle of the item to be recycled 70 mounted on the turntable 63 is identified from the external images captured in steps S302 and S304, and the processing proceeds to step S314.

In step S314, it is determined whether the present step is the final step or not; when the present step is not the final step (No), in step S315 the removed component is identified and, the operating time taken in removing the identified component is counted (step S316). The operating time of each component is counted by starting timing from the end of the immediately preceding operation and stopping timing at the point where the present operation ends (i.e. the point where the present component has been removed). The operating times that have been counted are stored in an operation analysis database 72.

Figures 16, 17:
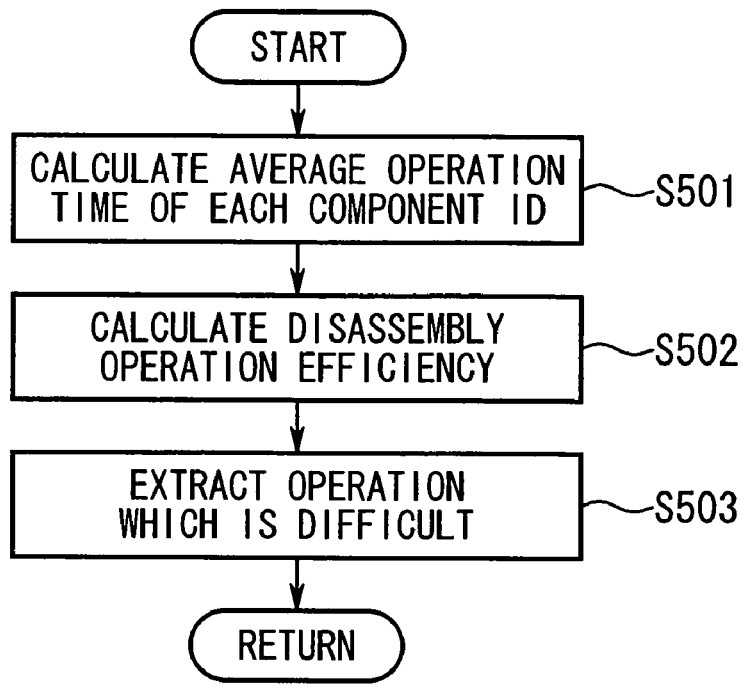
FIG. 16 is a flowchart showing an operation of extracting a difficult operation.
FIG. 17 is a diagram showing the table constitution of an operation analysis database 72.

The table structure of the table which stores the operating times will be explained with reference to FIG. 17. FIG. 17 is a drawing showing the table structure of an actual operating time table in the operation analysis database 72. In this table, the component ID (disassembly actual component ID) of components that were identified in step S315 are stored in correlation with the operating times (actual operating times) that were counted in step S316. In this example, the table shows that "5 seconds" were required to remove a component having a component ID of "0001" (a screw). The tables stores the disassembly actual component ID and the operating times according to the sequence of operations.

In step S317, it is determined whether the present step has ended or not (whether all the component removal operations of the present step have ended or not), and step S316 will be repeated until the present step ends. Then, when it has been determined that the present step has ended, the processing shifts to step S318.

In step S318, the identified item disassembly data and the item disassembly data corresponding to the present step are read from the item disassembly database 60, and, shifting to step S320, the disassembly diagram construction process for construct a disassembly diagram is executed based on the item disassembly data that was read; then, in step S322, the constructed disassembly diagram is displayed on the display device 68, and, shifting to step S324, the image-capturing device 66 captures an external image of the item to be recycled 70 mounted on the turntable 63, and processing shifts to step S308.

On the other hand, in step S314, when it is determined that the present step is the final step (Yes), this series of processes ends and the sequence returns to the original processing. In this way, the operating times of all the removed components are stored in the actual operating time table of the operation analysis database 72.

Figure 13:
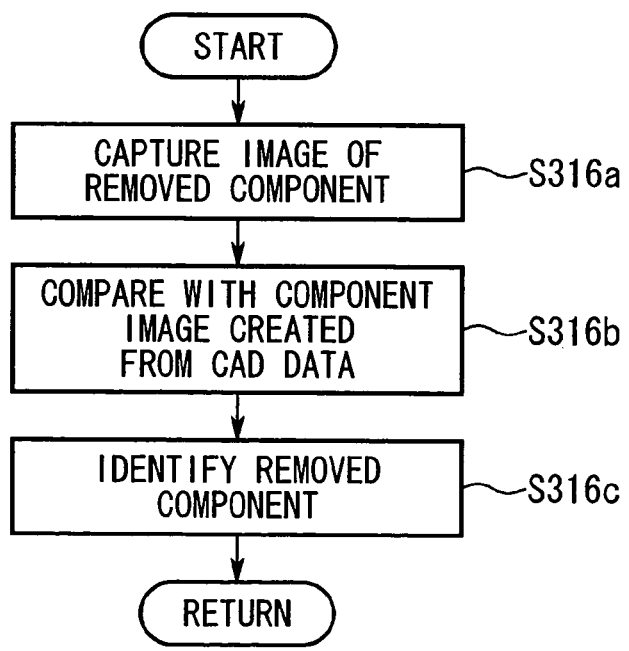
FIG. 13 is a flowchart showing a process of identifying a removed component.

Subsequently, the identification process of the removed component, executed in step 316, will be explained in detail with reference to FIGS. 13, 14, and 15. At first, referring to FIG. 13, a process of identifying the removed component by image recognition will be explained. FIG. 13 is a flowchart showing a process of identifying a removed component. At first, in step S316*a*, the image-capturing device 66 captures an image of the removed component. At this time, the disassembly operator can easily capture a close-up image of the removed component by placing it in front of the lens of the image-capturing device 66. Next, in step S316b, a component image created from component CAD data is compared with the image captured in step S316a. The component CAD data used in this comparison relates only to candidate components, which are likely to be removed in the present step. Subsequently, in step S316c, the removed component is identified based on the result of the comparison. This process of identifying the component is performed by selecting the candidate component having the highest matching CAD data.

Subsequently, referring to FIG. 14, a process of identifying the removed component, performed by a weight detector, will be explained. FIG. 14 is a flowchart showing a process of identifying a removed component, performed by a weight detector. At first, in step S316d, weight change in the turntable is detected by reading the output from the turntable weight detector 65. Only a reduction in weight caused by the removal of a component is detected. Since weight reduction in this case is caused only by removing a component, by making such weight reduction the only target of the detection, it is possible to prevent the processing from becoming complex, and prevent mistakes in detection arising when the disassembly operator has increased the weight at the moment of removing the component, and the like. Next, in step S316e, the weight of the components contained in the component data 404 is compared with the weight reduction detected in step S316d. The component weight used in this comparison is the weight only of candidate components, which may possibly be removed during the present step. Subsequently, in step S316f, the removed component is identified based on the result of the comparison. This process of identifying the component is performed by selecting the candidate component having the best matching component weight.

Subsequently, a process of identifying a removed component by using RFID will be explained with reference to FIG. 15. FIG. 15 is a flowchart showing a process of identifying a removed component, performed using RFID. At first, in step S316g, an RFID reader 71 reads the content of an RFID tag that is appended to the removed component, and thereby obtains the component ID. At this time, the disassembly operator can easily read the component ID of the removed component by placing it in front of the RFID reader 71. Then, in step S316h, the removed component is identified based on the component ID that has been read.

Figure 14:
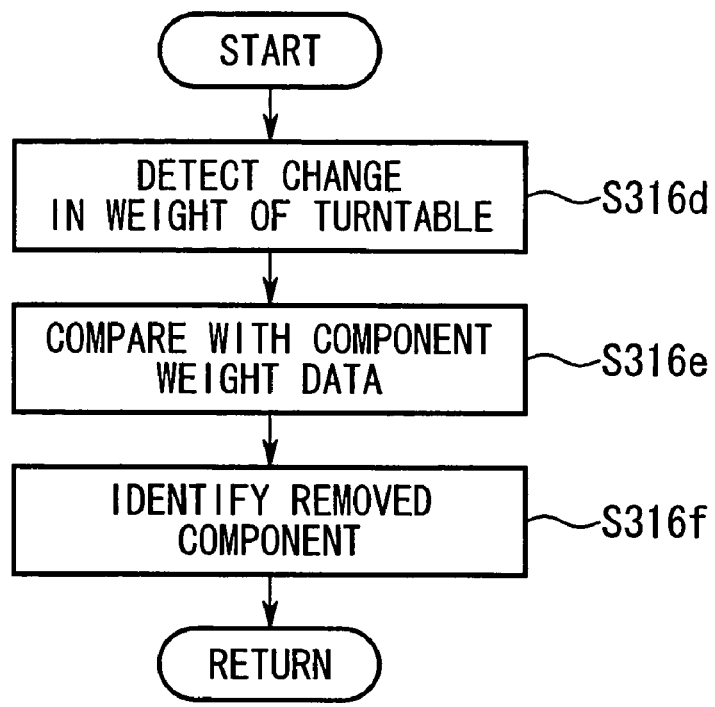
FIG. 14 is a flowchart showing a process of identifying a removed component.
Figure 15:
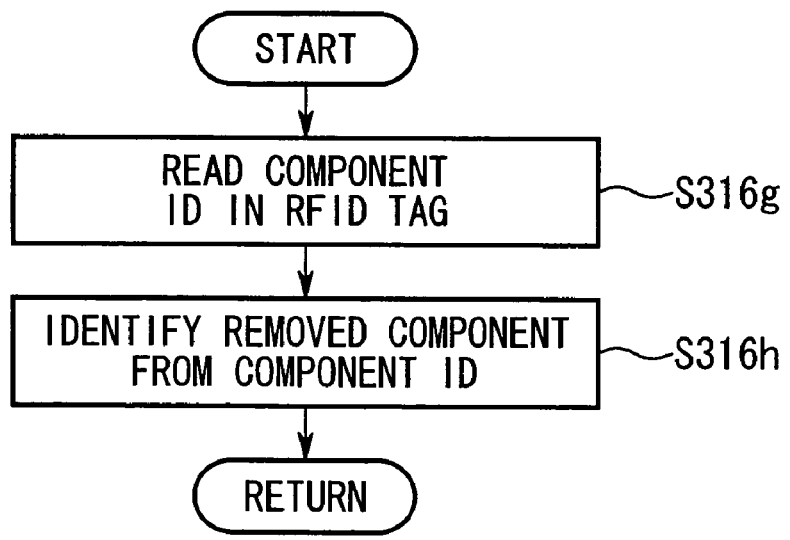
FIG. 15 is a flowchart showing a process of identifying a removed component.

Incidentally, the precision of the identification processes of the removed component shown in FIGS. 13 to 15 may be improved by combining them. For instance, by combining the image recognition and weight change processes, a component that is difficult to identify by its image can be identified by change in its weight, and a component that is difficult to identify by change in its weight can be identified by its image, enabling the steps of identification to be executed more accurately. Furthermore, large components can easily be identified by appending RFID tags, and components such as screws, which RFID tags are difficult to append to, can be identified by image recognition and weight change, enabling the steps of identification to be executed more accurately.

Subsequently, the disassembly diagram construction process in step S320 will be explained in detail with reference to FIG. 10.

Figure 10:
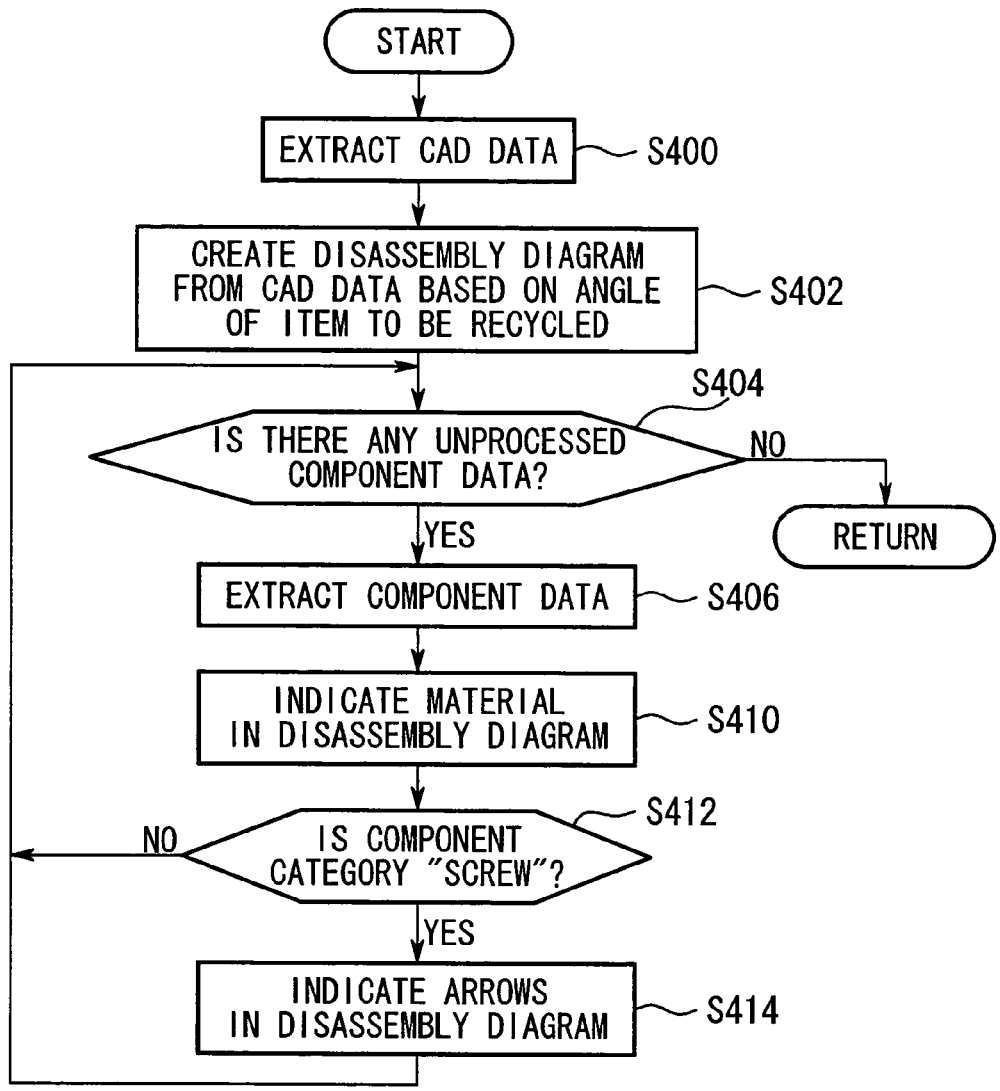
FIG. 10 is a flowchart showing a disassembly diagram constitution process.

FIG. 10 is a flowchart of the disassembly diagram construction process.

As shown in FIG. 10, to execute the disassembly diagram construction process, in step S320 described the above, at first, the processing shifts to step S400.

In step S400, the CAD data is extracted from the item disassembly data that was read in step S318, and, shifting to step S402, based on the angle of the item to be recycled 70 identified in step S312, a disassembly diagram including a front view seen from the disassembly operator is created from the CAD data, and the processing shifts to step S404.

In step S404, it is determined whether the item disassembly data, which has been read, contains any unprocessed component data or not, and if so (Yes), processing shifts to step S406, where the unprocessed component data is extracted from the item disassembly data, and then, in step S410, based on the extracted component data, the material of the component in the disassembly diagram (the component relating to the component data that was read) is indicated in the disassembly diagram, and processing proceeds to step S412.

In step S412, it is determined whether the component category is "screw"; when the component category is determined to be "screw" (Yes), processing proceeds to step S414, where an arrow is indicated in the disassembly diagram in accordance with the operator command direction, and the process shifts to step S404.

On the other hand, when it is determined in step S412 that the component category is not "screw" (No), the processing shifts to step S404.

On the other hand, when it is determined in step S404 that there is no unprocessed component data in the item disassembly data that has been read (No), this series of processes ends and the CPU 50 returns to its original processing.

Subsequently, the operation of the present embodiment will be explained.

At the recycling center 20, prior to disassembling the item to be recycled 70, the disassembly operator mounts the item to be recycled 70 on the turntable 63 in order to obtain item disassembly data, and captures an external image of the item to be recycled 70 by using the image-capturing device 66.

At the recycling center facility 200, when the external image of the item to be recycled 70 is captured, the item ID data of the item to be recycled 70 is identified based on the captured external image by following the steps S202 to S206, and the identified item ID data is transmitted to the data management center facility 100 together with an extraction request.

When the item ID data and the extraction request are received at the data management center facility 100, by executing step S104, all the item disassembly data corresponding to the item ID data are retrieved from the item disassembly database 40 based on the received item ID data. As a result, when the item disassembly data is retrieved, steps S108 and S110 are performed to read all the step management data corresponding to the retrieved item disassembly data from the step management database 42, and the retrieved item disassembly data and the read step management data are transmitted to the recycling center facility 200.

When the recycling center facility 200 receives the item disassembly data and the step management data, steps S210 and S212 are performed so as to store the received item disassembly data in correspondence with the item ID data in the item disassembly database 60, and the received step management data is similarly stored in correspondence with the item ID data in the step management database 62. Consequently, the disassembly operator at the recycling center facility 200 is able to obtain the necessary item disassembly data and step management data.

Subsequently, at the recycling center 20, the disassembly operator uses the image-capturing device 66 to capture an external image of the item to be recycled 70 mounted on the turntable 63.

At the recycling center facility 200, when the external image of the item to be recycled 70 is captured, the steps S304 and S306 are carried out to identify the item ID data of the item to be recycled 70 based on the captured external image, and all the step management data corresponding to the identified item ID data are read from the step management database 62. Next, in step S308, the external image that has been captured is compared with the step images contained in the step management data that was read, and the image data, which is identical or similar to the captured external image, is identified therefrom.

Subsequently, steps S310 and S312 are executed to identify the present step from the identified step images, and, based on the captured external image, the angle of the item to be recycled 70, which is mounted on the turntable 63, is determined. At this time, when the present step is not the final step, the removed component is identified to determine that the present step has ended; then, by carrying out steps S318 and S320, the identified item ID data and the item disassembly data corresponding to the present step are read from the item disassembly database 60, and the disassembly diagram is constructed based on the item disassembly data that has been read. More specifically, by performing steps S400 and S402, CAD data is extracted from the item disassembly data, and, based on the angle of the item to be recycled 70, the disassembly diagram is created from the CAD data as a front view seen from the disassembly operator. Then, in steps S406 and S410, the component data is extracted from the item disassembly data, and, based on the extracted component data, the material of the component in the disassembly diagram is indicated in the disassembly diagram. Moreover, when the component category of the component is "screw", via step S414, an arrow is indicated in the disassembly diagram in accordance with the operation command direction. The processes of steps S406 to S414 are then carried out for all of the component data contained in the item disassembly data.

Figure 11:
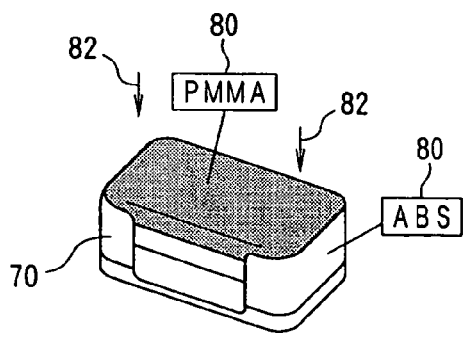
FIG. 11 is a diagram showing one example of a disassembly diagram.

FIG. 11 is a drawing showing one example of a disassembly diagram. In the example of FIG. 11, a material numeral 80 is appended to the component including the item to be recycled 70, and arrows 82 indicating the operation command direction are appended to the screw, which includes the item to be recycled 70. Incidentally, reference code "PMMA" of the material numeral 80 represents acryl, and "ABS" represents ABS resin.

At the recycling center facility 200, when the disassembly diagram is constructed, steps S322 and S324 are carried out to display the constructed disassembly diagram on the display device 68, capturing the external image of the item to be recycled 70. Then, the processes of steps S308 to S324 are repeated until the final step of the disassembling operation.

In this way, in the present embodiment, the data management center facility 100 has the item disassembly database 40, which stores the item disassembly data in correspondence with the item ID data, and, when an item ID data is received, the item disassembly data is retrieved from the item disassembly database 40 based on the received item ID data, and the retrieved item disassembly data is transmitted to the recycling center facility 200; the recycling center facility 200 reads the item ID data from the item to be recycled 70, and transmits the item ID data which has been read to the data management center facility 100; when the item disassembly data has been received, one of a plurality of possible disassembly diagrams is constructed from the received item disassembly data, in accordance with the progress of the disassembling operation of the item to be recycled 70, and the constructed disassembly diagram is displayed on the display device 68.

This enables the disassembly operator to ascertain the specific disassembly procedures for disassembling the item to be recycled 70 from the disassembly diagram, and, in addition, does not require any considerable time or effort, enabling him to determine the appropriate procedures in accordance with the progress of the disassembling operation, and achieving a more effective disassembling operation than by conventional methods.

Furthermore, in the present embodiment, the recycling center facility 200 has the image-capturing device 66 for capturing an external image of the item to be recycled 70, enabling the progress of the disassembling operation to be determined based on the external image captured by the image-capturing device 66, and, in accordance with the determined progress, one of a plurality of possible disassembly diagrams is constructed from the received item disassembly data.

Consequently, since the progress of the disassembling operation is determined from the external image of the item to be recycled 70, the disassembly operator can ascertain the appropriate sequence in accordance with the progress of the disassembling operation. Furthermore, the disassembly operator does not need to make a special command for relating to the progress of the disassembling operation during the operation. Therefore, the disassembling operation can be performed more efficiently.

Moreover, in the present embodiment, the data management center facility 100 has the step management database 42 which stores step management data, and, by reading the step management data corresponding to the retrieved item disassembly data from the step management database 42, and transmitting the retrieved item disassembly data and the read step management data to the recycling center facility 200, the recycling center facility 200 can compare the external image, captured by the image-capturing device 66, with the step images contained in the received step management data, and identify an identical or similar external image from among them, and can then construct a disassembly diagram from among a plurality of possible disassembly diagrams based on the received item disassembly data, such that the disassembly diagram corresponds to the identified external image.

Consequently, since the disassembly diagram corresponds to the external image of the item to be recycled 70, the disassembly operator can ascertain the appropriate sequence in accordance with the progress of the disassembling operation. Therefore, the disassembling operation can be performed even more efficiently.

Moreover, in the present embodiment, the recycling center facility 200 constructs the disassembly diagram so as to be a front view of the item to be recycled 70 seen from the disassembly operator.

Since the disassembly diagram is a front view seen from the disassembly operator, he can easily ascertain the specific procedures for disassembling the item to be recycled 70. Therefore, the disassembling operation can be performed even more efficiently.

Moreover, in the present embodiment, the disassembly diagram contains the material numeral 80 for classifying the material of the component that includes the item to be recycled 70.

Consequently, the disassembly operator can classify the component including the item to be recycled 70 by referring to the material numeral 80 that is displayed, making the classification operation simple. Therefore, the classification operation can be performed more efficiently than when following conventional methods.

Moreover, in the present embodiment, the disassembly diagram includes the arrows 82, which indicate the position of a screw for securing the component that includes the item to be recycled 70.

This enables the disassembly operator to ascertain the position of the screw for securing the component that includes the item to be recycled 70 by referring to the displayed arrows 82, facilitating the disassembling operation. Therefore, the disassembling operation can be performed even more efficiently.

Figure 12:
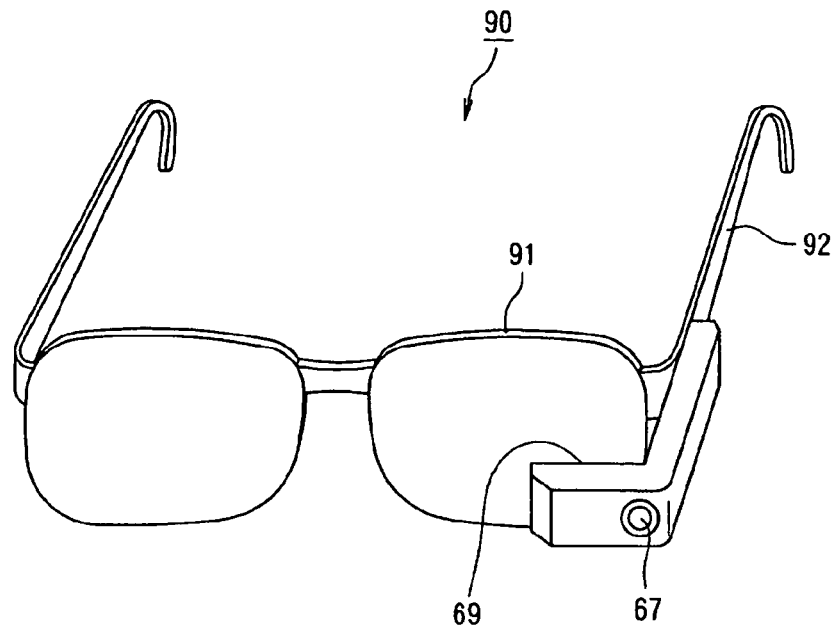
FIG. 12 is a diagram showing the constitution when a display device and an image-capturing device are provided to glasses 90 worn by the disassembly operator.

In the embodiment described the above, the display device 68 is fitted to the turntable 63 and the image-capturing device 66 is fitted to the display device 68, but the constitution is not restricted to this arrangement; instead, as shown in FIG. 12, the display device and the image-capturing device may be fitted to glasses 90, which are worn by the disassembly operator.

Subsequently, referring to FIG. 16, there will be explained a process of extracting one of the component disassembling operations that is deemed to be difficult. Before explaining this operation, a table, which is stored beforehand in the operation analysis database 72, will be explained with reference to FIGS. 17 and 18. FIG. 18 shows the table structure of a necessary operations table, which defines a necessary operation for each component ID of the components to be disassembled. "Necessary operation" signifies a group of smallest operation units needed to remove the component in question. In this example, the component having a component ID of "0001" (screw) can be removed by performing the operation having an operation ID of "1", and the component having a component ID of "0002" (panel 01) can be removed by combining the operations having operation ID of "10" and "11". FIG. 19 shows the structure of a standard operation time table, which defines standard operation times for each operation ID. "Standard operation time" is a standard time allocated beforehand to each operation. In this example, a standard operation time of "5 seconds" is allocated to the operation having an operation ID of "1" (e.g. using an electric tool to remove a screw).

The standard time will be explained. Depending on the availability of resources and level of use, the standard time can be set by a wide range of methods, such as estimation by an experienced expert (estimate based on prior experience), using actual past averages (actual time method), timing one operator using a stopwatch and giving him a rating, using an internationally recognized PTS (predetermined time standard) (methods and systems such as MTM, WF, and MOST), and the like; ideally, however, the standard time should be set by using an "preferable type" ideal "standard method", whereby the time required for executing this "standard method" is counted by PTS and used as the basic time, with any additional time required being added thereafter. The PTS method is known as predetermined time standard, in which an operation performed by a person is broken down into its basic motions, a predetermined time value is allocated to each basic motion to calculate a standard operation time. The method is based on Segur's principle that "under fixed conditions, an experienced operator will perform basic motions in a fixed time". Advantages of this method are that the time can be calculated provided it is possible to break down in advance the basic motions of the operation, the nature of the basic motions, and the conditions, enabling the time to be set by computation alone, without examining at an actual operation; the time can be calculated before production starts, as long as diagrams and operating methods have been determined, and there is no need to use a stopwatch, or ratings; since there are no variations between operations, the standard operation time is comprehensive; and the like. PTS has been researched since the 1920s, and various methods have been developed. The methods most commonly used in Japan today are MTM and WF.

In this way, the operations needed to disassemble the component can be obtained by referring to the necessary operation time shown in FIG. 18, and the operation time needed for each operation can be obtained by referring to the standard operation time table shown in FIG. 19. For example, to remove the component whose component ID is "0002" (panel 01), the operations having IDs of "10" and "11" must be performed. It can also be seen that the necessary times are "15 seconds" for operation "10" (e.g. removing a wire connector) and "20 seconds" for operation "11" (e.g. removing a join section). Therefore, the standard operation time for the component ID "0002" is 35 seconds.

Subsequently, the operation of extracting a difficult operation will be explained with reference to FIG. 16. FIG. 16 shows a flowchart in which the operator performing the disassembly gives a command to start the operation at a given time. As a result of this command, the processing in FIG. 16 is executed. At first, referring to the actual operation time table in the operation analysis database 72, the average operation time of each component ID is calculated (step S501). The average operation times are calculated by adding together all the actual operation times of one component ID, and dividing the total by the number of actual operation times. This obtains the average operation time of each component.

Next, in step S502, the disassembling operation efficiency of each component is calculated. The disassembling operation efficiency is calculated by obtaining the standard operation time from the necessary operation table and the standard operation times, and computing "disassembling operation efficiency=average operation time÷standard operation time", using the standard operation time and the average operation time that was determined above. Consequently, the disassembling operation efficiency of each component is determined, and, if the disassembling operation efficiency is the same as the standard operation time, a disassembling operation efficiency of "1" is set; if it is shorter than the standard operation time. "less than 1" is set, and if it is longer than the standard operation time, "a value greater than 1" is set.

Next, in step S503, a difficult operation is extracted. The disassembling operation of components having a disassembling operation efficiency of "greater than 1, less than 1.5" is deemed "slightly difficult", those with disassembling operation efficiency of "greater than 1.5, less than 2" are deemed "difficult", and those greater than "2" are deemed "extremely difficult", the results being output from an unillustrated printer or the like.

In the foregoing explanation, disassembling operation efficiency is determined from the standard time, and difficult operation are extracted based on the disassembling operation efficiency, but difficult operations may be identified by the following methods instead.

(1) Operations for components in the same appliance having long average operation times are deemed difficult.

(2) Same necessary operations in the same appliance are deemed difficult when they have long average operation times. For instance, operations of removing a screw within the same appliance are deemed difficult where they have long average operation times.

(3) Similar components within the same group of appliances are deemed to have difficult operations when their average operation times are long. For instance, the operation of disassembling a control panel in a plurality of same-series printers may be deemed difficult if it has a long disassembling operation time.

(4) Same as in methods (1) to (3), but also incorporating a comparison with the standard time.

With regard to the disassembling operation of each component, the time taken from the start of the operation until its end is automatically calculated and compared with standard time, in order to extract difficult operations; this enables the difficulty of each disassembling operation to be evaluated objectively. Further, by notifying the design department of the evaluation results, the evaluations can be used as reference data for redesigning the product with greater consideration given to facilitating its disassembly.

FIG. 12 shows the constitution when the display device and the image-capturing device are fitted to glasses 90, worn by the disassembly operator.

In FIG. 12, a display device 69 includes a liquid crystal display (LCD), and is fitted to one of the lenses 91 of the glasses 90 so that, when wearing the glasses 90, the disassembly operator can see the disassembly diagram displayed on a display device 69; in addition, an image-capturing device 67 is fitted to a frame 92 of the glasses 90 so as to enable the disassembly operator to capture an external image of the item to be recycled 70 while he is wearing the glasses 90 and looking at the item to be recycled 70.

According to this constitution, at the recycling center facility 200, since the display device 69 is fitted to one lens 91 of the glasses 90, when the disassembly operator wears the glasses 90 he can see the disassembly diagram displayed on the display device 69. Furthermore, since the image-capturing device 67 is fitted to the frame 92 of the glasses 90, when the disassembly operator looks at the item to be recycled 70 while wearing the glasses 90, he can use the image-capturing device 67 to capture the external image of the item to be recycled 70.

As a consequence, the disassembly operator can perform the disassembling operation while looking at the disassembly diagram through the glasses 90, requiring no extra time or effort to refer to the disassembly diagram. Furthermore, the external image of the item to be recycled 70 can be captured from the view-point of the disassembly operator, enabling him to accurately ascertain the progress of the disassembling operation, and ascertain the appropriate procedures in accordance with the progress of the disassembling operation. Therefore, the disassembling operation can be performed even more efficiently.

Although the present embodiment describes a case where a control program, stored beforehand in the ROM 32, is used to execute the processes of the flowchart shown in FIG. 5, the present invention is not restricted to such a constitution; instead, a program illustrating the processes may be stored on an unillustrated recording medium and read to the RAM 34.

In the embodiment described the above, the processes of the flowcharts in FIGS. 8 to 10 and FIG. 16 are executed by using a program stored beforehand in the ROM 52, but the present invention is not restricted to such a constitution; instead, a program illustrating the processes may be stored on an unillustrated recording medium and read to the RAM 54.

The recording medium may comprise a semiconductor recording medium such as a RAM or a ROM, a magnetic recording medium such as an FD or an HD, an optically-read recording medium such as a CD, a CDV, an LD, or a DVD, or a magnetic/optically-read recording medium such as an MO, or any type of recording medium which can be read by a computer, whether the method for reading the recording medium is electronic, magnetic, optical, or whatever.

The above embodiment describes a case where the recycling analyzing system, the recycling center facility, the data management center facility, the program for the facility, and the recycling analyzing method according to the present invention, are applied in a network system including the internet 199, but the present invention is not restricted to this application; for instance, it can be applied in a wide variety of intranets which transmit communications by the same method as the internet 199. In addition to networks which transmit by the same method as the internet 199, the present invention can of course be applied in normal networks.

Furthermore, the above embodiment describes a case where the recycling analyzing system, the recycling center facility, the data management center facility, the program for the facility, and the recycling analyzing method according to the present invention, are applied in disassembling and classifying items to be recycled, such as OA products and electrical household appliances, at a recycling center 20, as shown in FIG. 1, but the present invention is not restricted to the above application, and can be applied in a variety of other cases without deviating from its main point.

What is claimed is:

1. A recycling analyzing system which analyzes disassembly of an item to be recycled, comprising:
    a standard operation time memory which stores standard time for disassembling operation of each component beforehand;
    an operation time memory which stores time for disassembling operation of each component to be disassembled;
    an operation time measuring unit which measures the time for disassembling operation of each component which constitutes the item to be recycled, and stores the time for disassembling operation in the operation time memory; and
    a difficult operation extracting unit which refers to the standard time for disassembling operation stored in the standard operation time memory, and the time for disassembling operation of each component stored in the operation time memory, and extracts disassembling operation which is difficult.

2. The recycling analyzing system according to claim 1, wherein the difficult operation extracting unit extracts the disassembling operation of each component which is difficult, based on a comparison between the standard time for disassembling operation and the time for disassembling operation.

3. A recycling analyzing method which analyzes disassembly of an item to be recycled, comprising:
    an operation time measuring step for measuring time for disassembling operation of each component which constitutes an item to be recycled; and
    a difficult operation extracting step for referring to standard time for disassembling operation of each component stored beforehand, and time for disassembling operation of the each component, and extracting disassembling operation which is difficult.

4. A computer readable media encoded with a program which analyzes disassembly of an item to be recycled, and allows a computer to execute:

an operation time measuring process for measuring time for disassembling operation of each component which constitutes an item to be recycled; and a difficult operation extracting process for referring to standard time for disassembling operation of each component stored beforehand, and time for disassembling operation of the each component, and extracting disassembling operation which is difficult.

* * * * *